(12) United States Patent
Hugo et al.

(10) Patent No.: US 10,239,373 B2
(45) Date of Patent: Mar. 26, 2019

(54) VEHICLE COMPONENTS AND SACRIFICIAL RIBS

(75) Inventors: Edd Hugo, Southam (GB); James Pinkerton, Warwick (GB); Jason Walters, Warwick (GB); Julian Buckingham, Leamington Spa (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 1093 days.

(21) Appl. No.: 14/127,936

(22) PCT Filed: Jun. 21, 2012

(86) PCT No.: PCT/EP2012/062038
§ 371 (c)(1),
(2), (4) Date: Mar. 17, 2014

(87) PCT Pub. No.: WO2012/175645
PCT Pub. Date: Dec. 27, 2012

(65) Prior Publication Data
US 2014/0199503 A1    Jul. 17, 2014

(30) Foreign Application Priority Data

Jun. 21, 2011 (GB) .................................... 110485.8

(51) Int. Cl.
*B62D 21/15* (2006.01)
*B60G 7/00* (2006.01)

(52) U.S. Cl.
CPC ...... *B60G 7/001* (2013.01); *B60G 2204/4308* (2013.01); *B60G 2206/121* (2013.01); *B60G 2206/71* (2013.01); *B60G 2206/7102* (2013.01); *Y10T 428/13* (2015.01); *Y10T 428/2457* (2015.01); *Y10T 428/24479* (2015.01)

(58) Field of Classification Search
CPC ...... B60G 2204/4308; B60G 2206/121; B60G 2206/71; B60G 2206/7102; B60G 7/001; Y10T 428/13; Y10T 428/24479; Y10T 428/2457; B62D 21/15–21/155
USPC ...................... 180/69.1, 346; 280/770, 304.3, 280/124.134–124.153
See application file for complete search history.

(56) References Cited

U.S. PATENT DOCUMENTS

| | | | |
|---|---|---|---|
| 3,079,137 A * | 2/1963 | Schilberg | B60G 3/02 267/248 |
| 4,787,468 A | 11/1988 | Kobayashi | |
| 5,813,491 A | 9/1998 | Sato et al. | |
| 6,113,058 A | 9/2000 | Iwasaki | |
| 6,199,652 B1 | 3/2001 | Mastroianni et al. | |
| 6,435,298 B1 | 8/2002 | Mizuno et al. | |
| 6,561,718 B1 * | 5/2003 | Archer | B60G 7/00 267/292 |
| 7,651,425 B2 | 1/2010 | Shimizu | |
| 2006/0108763 A1 * | 5/2006 | Ray | B60G 3/20 280/124.136 |
| 2007/0228714 A1 | 10/2007 | Bowers | |
| 2010/0264615 A1 | 10/2010 | Guttilla et al. | |
| 2011/0044818 A1 | 2/2011 | Kuhne et al. | |
| 2011/0062749 A1 | 3/2011 | Graham et al. | |

FOREIGN PATENT DOCUMENTS

| | | |
|---|---|---|
| CN | 101290063 A | 10/2008 |
| CN | 101566222 A | 10/2009 |
| DE | 4029641 A1 | 4/1991 |
| DE | 10149022 A1 | 4/2003 |
| DE | 102009008839 A1 | 8/2010 |
| EP | 1035982 B1 | 9/2000 |
| JP | S4716489 Y1 | 6/1972 |
| JP | S58153191 U | 10/1983 |
| JP | S58183780 A | 10/1983 |
| JP | S60191826 A | 9/1985 |
| JP | H02127505 U | 10/1990 |
| JP | H0438391 U | 3/1992 |
| JP | H05319047 A | 12/1993 |
| JP | H06106932 A | 4/1994 |
| JP | H10299805 A | 11/1998 |
| JP | 2009196557 A | 9/2009 |
| WO | WO9929529 A1 | 6/1999 |

OTHER PUBLICATIONS

English summary of Chinese Office Action corresponding to CN application No. 201280030954.6, dated Jan. 21, 2016, 10 pages.
English summary of Japanese Office action corresponding to JP application No. 2014-516359, dated Jan. 20, 2015, 2 pages.
UK Combined Search and Examination Report for corresponding application No. 1110485.8, dated Oct. 5, 2011, 2 pages.
Japanese Office Action in Japanese with English summary for JP application No. 2015-207712, dated Apr. 4, 2017, 5 pages.
International Search Report for PCT/EP2012/062038, dated Aug. 24, 2012, 4 pages.

* cited by examiner

*Primary Examiner* — Lawrence D Ferguson
(74) *Attorney, Agent, or Firm* — Reising Ethington P.C.

(57) ABSTRACT

A structural component 1 is provided for a vehicle designed for driving off-road on rough terrain. The component 1, such as the lower control arm of a suspension system, is formed from aluminum, aluminum-alloy or other light-weight material and provided on its underside with a parallel arrangement of chamfered ribs 5 which extend in the direction of travel of the vehicle. The spacing between adjacent ribs 5 is less than or equal to 10 mm so as to prevent underlying rocks and stones 7 from impacting, and thereby abrading the inner surface 3 of the component 1. The ribs 5 are provided as sacrificial elements and will become eroded in use until they no longer provide the desired protection of the inner surface 3. The extent of abrasion of the ribs 5 can be ascertained by a visual inspection of the underlying surface of the vehicle, and, if necessary, the component 1 can be replaced.

18 Claims, 4 Drawing Sheets

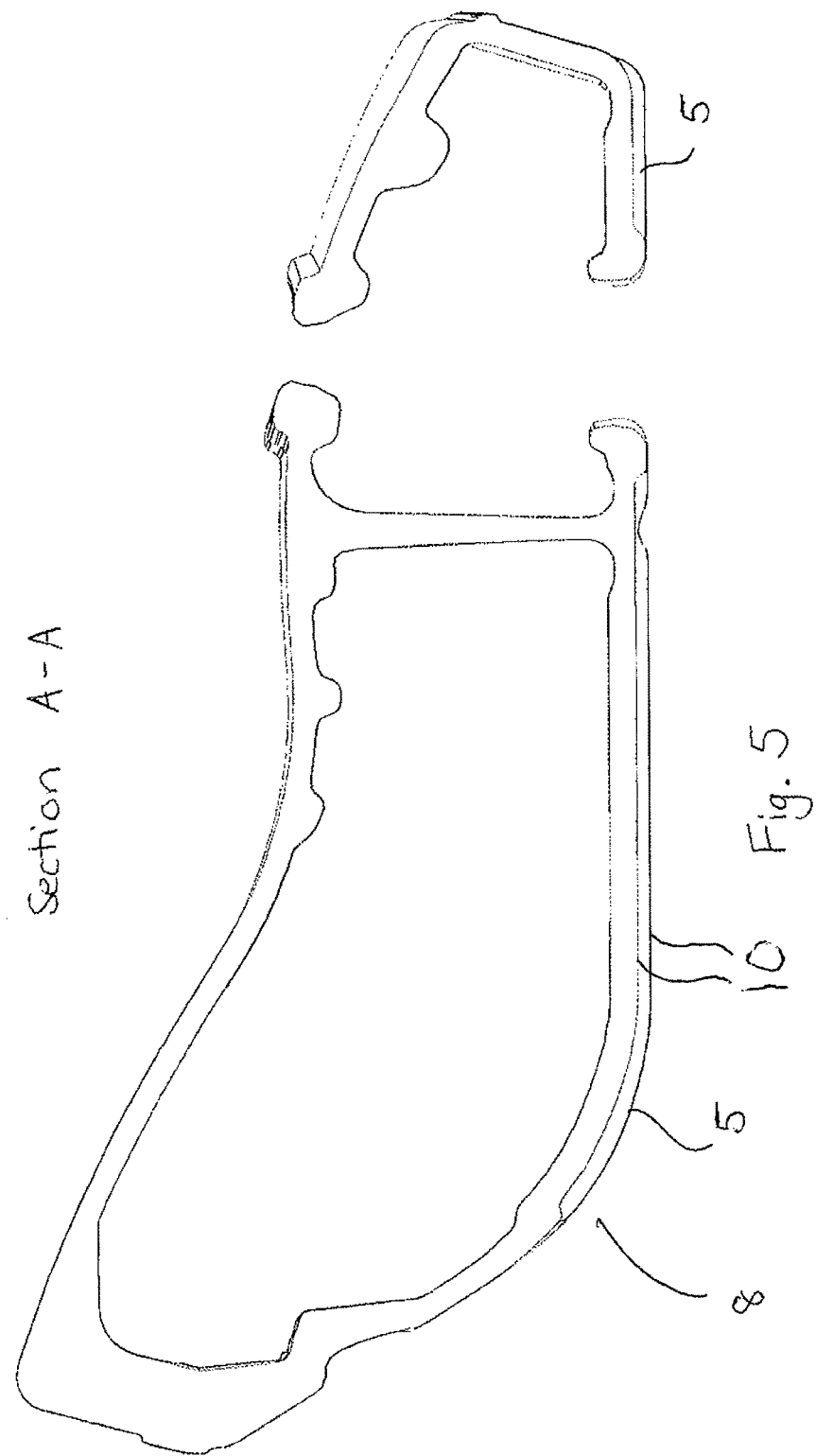

VEHICLE COMPONENTS AND SACRIFICIAL RIBS

FIELD OF THE INVENTION

The present invention relates to components for vehicles, and particularly to components for off-road vehicles which can be subjected to abrasion by impact with underlying rocks and stones when driving on rough terrain. However, the present invention is also applicable to on-road vehicles which are subject to impact abrasion from stones and other debris encountered during normal driving on roads. Aspects of the invention relate to a structural component, a component, and to a vehicle.

BACKGROUND

At present, the underlying surfaces of the road vehicles are made from materials which are sufficiently strong to withstand such impacts, so that impact erosion, by abrading, over the lifetime of the vehicle is generally insufficient to affect adversely the operation of the vehicle.

However, the requirement for such materials to be sufficiently robust results in the use of relatively heavy metals, such as cast steel. This, in turn, results in a high overall weight of the vehicle, and consequential high fuel consumption.

It would be highly advantageous to be able to construct the underlying surfaces of vehicles from lighter materials, since this would reduce fuel consumption, but this would normally exacerbate the above problem of impact erosion.

It would therefore be desirable to provide an arrangement which seeks to overcome, or at least mitigate, the above problem.

STATEMENT OF THE INVENTION

Embodiments of the invention may be understood with reference to the appended claims.

Aspects of the invention relate to a structural component, a component, and to a vehicle.

In accordance with one aspect of the present invention there is provided a structural component for a vehicle which defines, at least in part, an underlying surface of the vehicle which is subjected to impact erosion, the underlying surface having a configuration in which the impact erosion is concentrated on one or more surface features, the arrangement being such that the surface features constitute sacrificial regions which become eroded thereby to at least partly protect the remainder of the surface from impact erosion.

"Structural component" is intended to mean an integral conventional structural or functional component of a vehicle, but it is not intended to include components whose sole or main purpose is to protect or cover other components of the vehicle.

In accordance with a further aspect of the present invention there is provided a component for a vehicle which, in use, defines an underlying surface of the vehicle which is subjected to impact erosion, the underlying surface having a configuration in which impact erosion by abrasion is concentrated on one or more surface features, the arrangement being such that the surface features constitute sacrificial regions which become eroded in use, thereby protecting the remainder of the surface from impact erosion.

In accordance with another aspect of the present invention, there is provided a structural component for a vehicle, the structural component comprising an underlying surface arranged to define in use on a vehicle, at least in part, an underlying surface of the vehicle which may be subjected to impact erosion, the underlying surface of the component having a configuration in which any impact erosion in use will be concentrated on one or more surface features, the one or more surface features constituting sacrificial regions which are arranged to become eroded thereby to at least partly protect the remainder of the surface from impact erosion.

With such an arrangement, it is desirable that the component be designed such that the partial, or even total, removal of the surface features by abrasion does not impact on the integrity or function of the component of the vehicle. In this way, it is possible for the component to be made from a lighter material which would, in the absence of the surface features of the present invention, otherwise be subject to damage from impact abrasion.

In accordance with another aspect of the invention, there is provided a component for a vehicle, the component having an integral underlying surface arranged to define in use on a vehicle, at least in part, an underlying surface of the vehicle which may be subjected to impact erosion, the underlying surface of the component having a configuration in which any impact erosion in use will be concentrated on one or more surface features, the one or more surface features constituting sacrificial regions which are arranged to become eroded thereby to at least partly protect the remainder of the surface from impact erosion, the component being arranged such that the partial, or even total, removal of the surface features by abrasion does not impact on the integrity or function of the component.

The underlying surface is part of the structural component, and no further measures need to be taken to protect the component. Construction is simple and less material can be used, resulting in weight and cost savings. An integral structure provides a strong arrangement, with no points of weakness due to joining.

As the underlying surface is integral with the rest of the component, a separate cover does not need to be attached to protect the component. This simplifies construction and means that less material needs to be used, resulting in weight and cost savings. In addition, there are no points of weakness associated with fixing points as with a cover.

Furthermore, a visual inspection of the underside of the vehicle will determine the point at which the surface features have become eroded to such an extent that they no longer afford protection to the remainder of the underlying surface, and therefore the point at which the component will need replacement.

The component may be a cast component. Alternatively, the surface features may be created on the component by machining.

By "integral" is meant that the underlying surface of the component is not fixed or joined to the component, but is a continuous part of the component, formed with or from the component, i.e. it is formed at the same time as the rest of the component, for example in a single casting, or machined from the rest of the component.

The underlying surface may include a first region which, in use, faces the surface over which the vehicle is travelling (e.g. the road or off-road surface).

The underlying surface may also extend over a second region, which, in use, faces the front of the vehicle. Such an arrangement provides protection against both vertical and forward impacts.

The underlying surface may also extend over a third region, which, in use faces the rear of the vehicle, such that the structural component is protected from impacts to the rear also.

The configuration of the underlying surface of the component may comprise a plurality of projections, since these will be preferentially subjected to impact erosion as compared with the surrounding recessed portions of the underlying surface.

In an embodiment, the projections are in the form of a number of ribs extending in use along the underlying surface of the vehicle. Each rib may advantageously extend substantially along the driving direction of the vehicle, since abrasion with underlying rocks and stones encountered in rough off-road terrain will occur along the direction of travel of the vehicle. Similarly, when travelling on roads, any stones or other debris hitting grooves between the ribs will tend to impact the groove at a glancing angle and continue to move in generally the same direction along the length of the groove. In contrast, if the ribs were oriented perpendicular to the direction of travel, the stones would tend to hit the sides of the ribs and be deflected back in the opposite direction, resulting in a greater degree of erosion of the surface of the ribs.

Each rib advantageously has a substantially planar surface extending across most of the width of the rib, since this will serve to inhibit snagging and/or tearing of the rib. The planar surface will typically be generally parallel to the overall underlying surface of the structural component. The sides and ends of the ribs are advantageously chamfered, since erosion of any material is typically greater at perpendicular edges, and the ribs will therefore be of a generally trapezoidal cross section. Alternatively, the ribs may be parallel-sided, such that the ribs are of rectangular or square cross section.

The pitch of the ribs, i.e. the spacing between the centre lines of each adjacent pairs of ribs, may conveniently be less than 20 mm. The width of each rib may be about 10 mm, and the spacing between adjacent ribs may be less than or equal to 10 mm, since this will prevent larger rocks and stones and other debris from damaging the region of the underlying surface between the ribs through abrasion. When travelling on roads, as opposed to off-road, it is the larger stones which contribute disproportionately to the abrasion on the underside of a vehicle, in view of their larger mass and hence larger momentum when impacting the underlying surface.

The depth of the each rib is dependent on the hardness of the material from which the ribs and the component are formed and the method of manufacture, the lifespan of the vehicle, the position of the component on the vehicle and the expected vehicle usage. For example, a forged aluminium alloy could have a thinner section than a sand cast aluminium alloy, and use on a 4×4 vehicle may require a thicker section than on a road-based vehicle.

The height of the ribs above the remainder of the underlying surface of the component represents the acceptable amount of material which can be eroded from the component over its lifetime. In practice, the height will be dependent on the hardness of the material, the type of manufacturing process, the expected lifespan of the vehicle, the position of the component on the vehicle and the expected usage. For example, a forged aluminium alloy could have a thinner section than a sand cast aluminium, and an off-road biased vehicle such as a 4×4 would be expected to require a greater height of ribs than a road-based vehicle. Typically, the ribs may have a height above the remainder of the surface of less than 5 mm, preferably less than 3 mm, and more preferably 2.8 mm.

The regions of the underlying surface between the rear ends of the ribs may be raised to the level of the upper surface of the ribs, resulting in a substantially flat surface at the rear of the component.

The ribs may be formed by a cutting process, e.g. milling. Alternatively, the component may be formed with the ribs already present, for example using a casting process.

The structural component may constitute the lower control arm of a suspension system of the vehicle.

Such control arms are conventionally made from cast or forged steel. However, with the present invention, it is possible to make the control arms from a suitable light-weight material, such as aluminium, and thereby reduce considerably the weight of the control arms and hence the fuel consumption of the vehicle incorporating the control arms.

Alternatively, the component may be a non-structural or non-load-bearing component of the vehicle.

Alternatively, the component may be one selected from: a fuel tank of the vehicle, one or more cross members for cradles, any element of a suspension system which, in use, defines, at least in part, an underlying surface of the vehicle which is subjected to impact erosion, an element of the exhaust system, a tow bar, a transmission, one or more brackets associated with a transmission, a transfer case, a rear differential, and any other component of a vehicle which, in use, defines, at least in part, an underlying surface of the vehicle which is subjected to impact erosion.

According to a yet further aspect of the present invention, there is provided a component for a vehicle which defines, at least in part, an underlying surface of the vehicle which is subjected to impact erosion, the underlying surface having a configuration in which the impact erosion is concentrated on one or more surface features, the arrangement being such that the surface features constitute sacrificial regions which become eroded thereby to at least partly protect the remainder of the surface from impact erosion, wherein the component is one selected from: a fuel tank of the vehicle, one or more cross members for cradles, any element of a suspension system which, in use, defines, at least in part, an underlying surface of the vehicle which is subjected to impact erosion, an element of the exhaust system, a tow bar, a transmission, one or more brackets associated with a transmission, a transfer case, and a rear differential.

The component may be made from a material selected from: (a) aluminium; (b) an aluminium alloy; (c) magnesium; and (d) a magnesium alloy. The component may be made from any material with similar density or wear characteristics to aluminium or an aluminium alloy. Such materials are considerably less dense than the types of steel which are typically used in components of vehicles and therefore significantly reduce the fuel consumption of the vehicle.

The present invention extends to a vehicle comprising a component as described above.

Within the scope of this application it is envisaged that the various aspects, embodiments, examples, features and alternatives set out in the preceding paragraphs, in the claims and/or in the following description and drawings may be taken independently or in any combination thereof.

BRIEF DESCRIPTION OF THE DRAWINGS

The present invention will now be described, by way of example only, with reference to the accompanying drawings, in which:

FIG. 5 illustrates a section view of the lower suspension arm in FIGS. 3 and 4 through line A-A (as indicated in FIG. 3).

DETAILED DESCRIPTION

Figure 1:
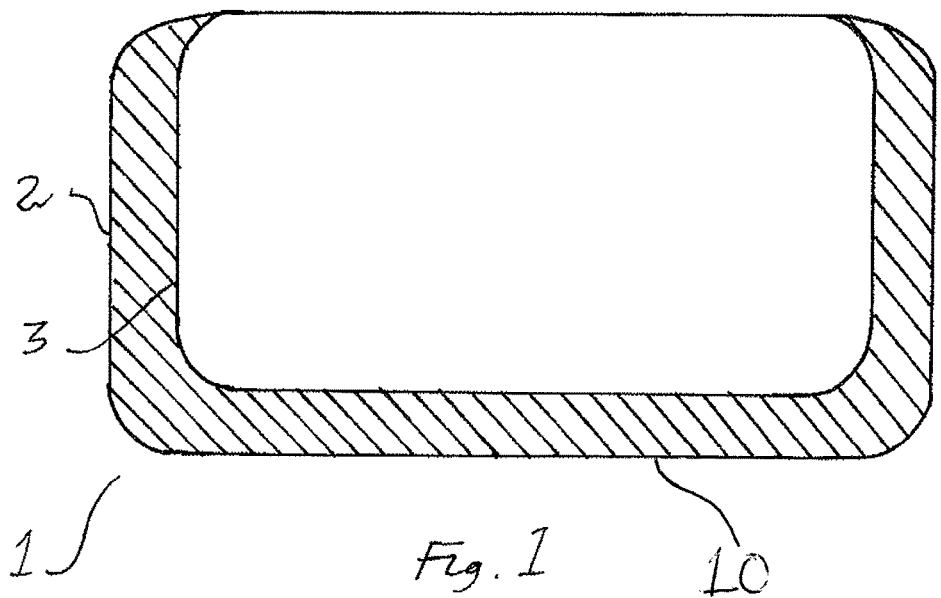
FIG. 1 is a schematic cross-sectional view of a component for a vehicle formed with an excess thickness of material on the underside.

Referring to FIG. 1, which is not drawn to scale, a structural component 1 for a vehicle, such as the lower control arm of a suspension system of the vehicle, is formed from aluminium, an aluminium alloy or other suitable lightweight material. The arm has an underside with an underlying surface 10 which, in use on a vehicle, forms part of the underlying surface of the vehicle, and will face the road surface. The underside has an excess thickness 2 of material. The thickness of the excess material 2 is typically 3 mm. The expression "excess thickness" is used to mean that the component 1 would be able to perform its normal function in the absence of this excess thickness of material 2. Reference numeral "3" indicates the surface of a conventional structural component for a vehicle which is formed without this excess material 2. Embodiments of the present invention seek to prevent this inner surface 3 from being eroded by abrasion due to impact with underlying rocks and stones and other debris typically encountered during driving of the vehicle, particularly when driving off-road.

Figure 2:
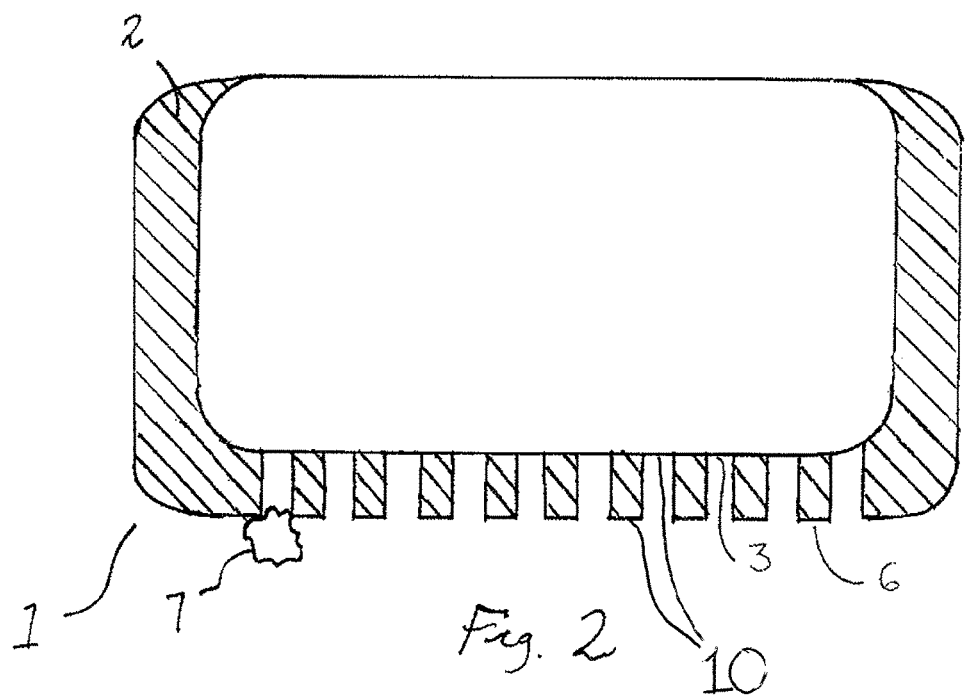
FIG. 2 is a schematic cross-sectional view of a component for a vehicle in accordance with an embodiment of the present invention prepared from the structural component shown in FIG. 1.

As shown in FIG. 2, in an embodiment of the invention, also not drawn to scale, the underlying surface 10 has a number of surface features 4, 5. The surface features comprise a number of substantially parallel grooves 4 which are cut into the excess material 2 to form a generally parallel array of projections or ribs 5, each rib having a width of about 10 mm. The cutting may be performed by a milling process. The structural component may alternatively be formed with the surface configuration already applied, for example using a casting process. The ribs 5 are formed on the component 1 such that, when the component is fitted on the vehicle, the ribs 5 extend along the direction of travel of the vehicle (i.e. perpendicular to the plane of the drawing) between front and rear ends of the component, relative to the vehicle (i.e. along the front-to-rear vehicle axis). The ribs 5 are formed with substantially flat upper surfaces 6 having chamfered edges (not shown). The spacing between adjacent pairs of ribs 5 is less than or equal to 10 mm, so as to prevent small stones, such as the stone 7 shown in the drawing, from impacting the inner surface 3 of the component 1 and thereby potentially damaging the component 1.

The ribs 5 formed from the layer of excess material 2 are provided as sacrificial elements, since most impacts from and/or direct contact with underlying rocks and stones will be borne by the ribs 5, and not by the inner surface 3 of the component 1.

The frequent impacts with underlying rocks, stones and other debris causes the ribs 5 gradually to become worn in use, and eventually the ribs 5 will become abraded to such an extent that the inner surface 3 will become exposed to such impacts.

However, the extent of erosion of the component 1 can readily be assessed by a visual inspection of the underside of the vehicle. When the ribs 5 have become eroded to such an extent that the inner surface 3 is insufficiently protected by the ribs 5, this provides an indication that the component 1 requires replacement, in the same manner that tyres are inspected regularly to ensure that the tread is of a sufficient depth. However, a major difference between the embodiment of the present invention and the provision of tread on tyres is that the ribs 5 are formed from material which is excess to that required for the component 1 to perform its function, whereas the full depth of tread provided on tyres serves to increase the grip of the tyres on the road surface. In this way, it is possible to ensure that the inner surface 3 of the component 1 remains intact and that the component 1 can therefore perform its intended function in the vehicle, even when some or all of the excess material 2 is eroded.

Figure 3:
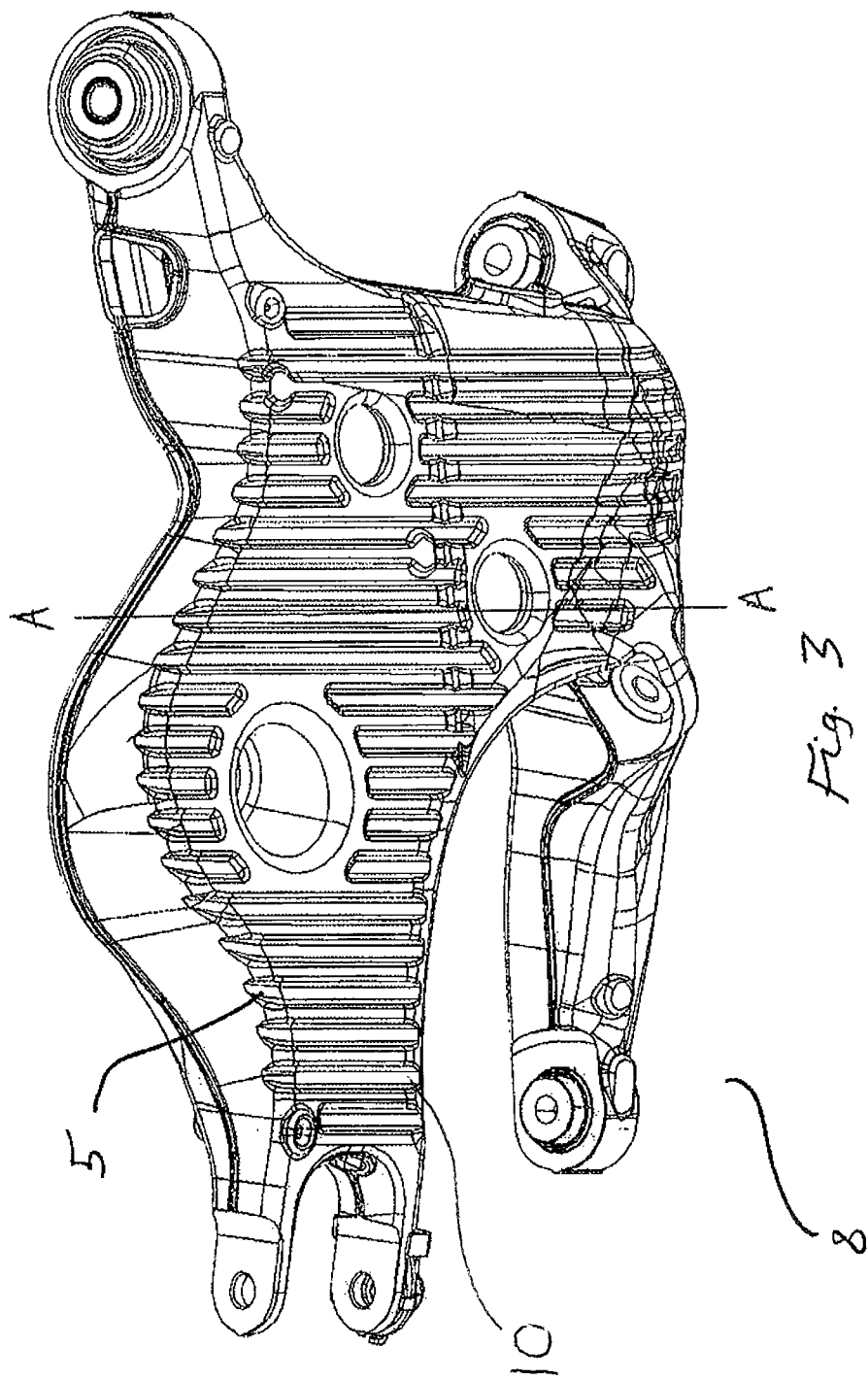
FIGS. 3 and 4 illustrate views of the underside of a lower suspension arm of a vehicle in accordance with an embodiment of the present invention.
Figure 4:
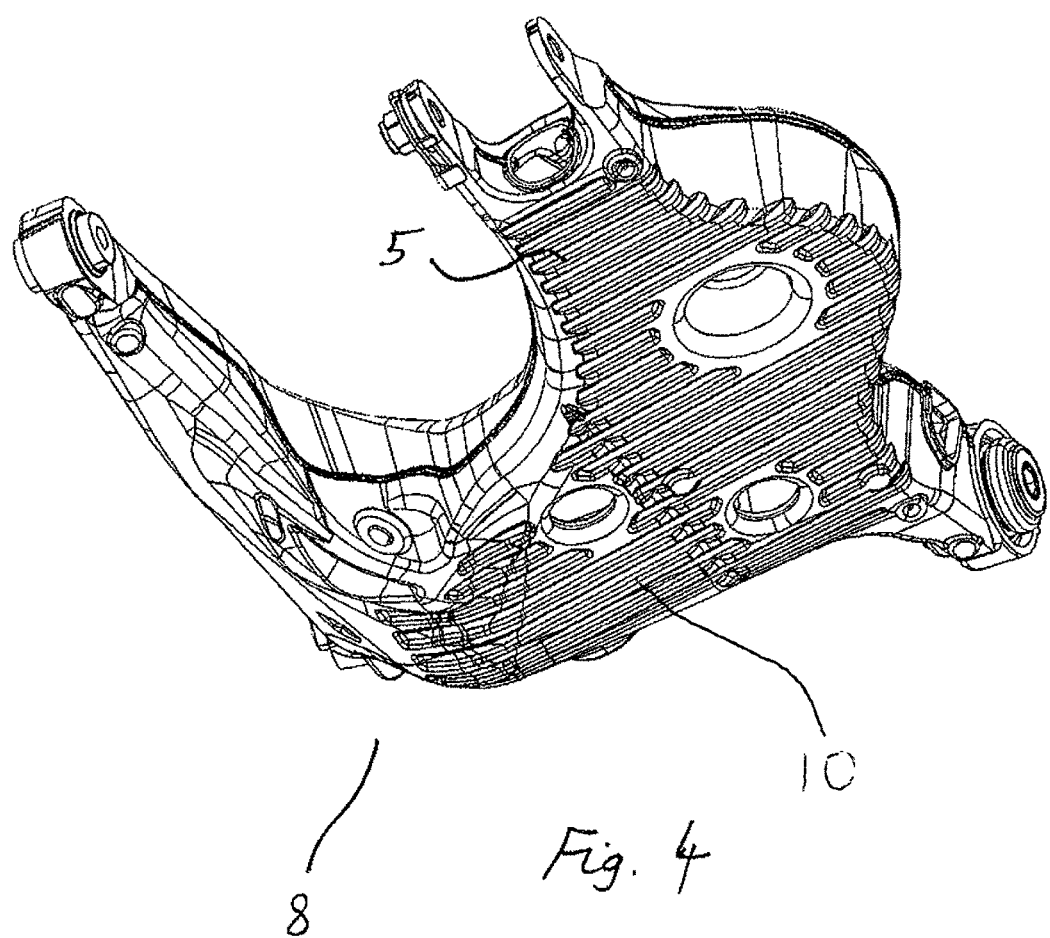

FIGS. 3 and 4 illustrate two different views of a lower control arm 8 of a suspension system incorporating the ribs 5 described above and illustrated schematically in FIG. 2, and FIG. 5 is a section view of the lower control arm 8 in FIGS. 3 and 4 through the line A-A. As shown in FIGS. 3, 4 and 5, each rib 5 is chamfered both along the sides and at the ends. Although advantageous embodiments of the present invention have been described above, it will be appreciated that numerous variations and modifications may be made without departing from the scope of the invention which is defined solely by the claims.

Although the embodiment above relates to a structural component the skilled man would understand that the invention could equally be applied to any component which, in use, defines, at least in part, an underlying surface of the vehicle which is subjected to impact erosion, such as a fuel tank of the vehicle, one or more cross members for cradles, any element of a suspension system which, in use, defines, at least in part, an underlying surface of the vehicle which is subjected to impact erosion, an element of the exhaust system, a tow bar, a transmission, one or more brackets associated with a transmission, a transfer case, or a rear differential.

The invention claimed is:

1. A lower control arm of a suspension system for a vehicle, comprising:
a plurality of projections on an underlying surface of the lower control arm that, in use, opposes a surface over which the vehicle is travelling;
wherein the plurality of projections comprise sacrificial elements and are configured to project substantially from the underlying surface of the lower control arm toward the surface over which the vehicle is travelling,
wherein the plurality of projections is configured so that any impact erosion in driving the vehicle is concentrated on the plurality of projections to protect the underlying surface of the lower control arm, so that the partial, or even total, removal of the plurality of projections by abrasion does not impact the integrity or function of the lower control arm.

2. A lower control arm as claimed in claim 1, wherein the underlying surface and the plurality of projections are formed integrally.

3. A lower control arm as claimed in claim 1, and made from a material selected from: (a) aluminium; (b) an aluminium alloy; (c) magnesium; and (d) a magnesium alloy.

4. A lower control arm as claimed in claim 1, wherein the lower control arm is a cast component.

5. A lower control arm as claimed in claim 1, wherein the plurality of projections extend across a sacrificial region of the underlying surface.

6. A lower control arm as claimed in claim 5, wherein each of the plurality of projections has a substantially planar surface extending across most of a width of each projection.

7. A lower control arm as claimed in claim 1, wherein the plurality of projections are configured to protect an inner surface of the underlying surface.

8. A lower control arm as claimed in claim 1, comprising a further sacrificial region on an underlying surface that faces the front or rear of the vehicle.

9. A lower control arm as claimed in claim 1, comprising a sacrificial region on an underlying surface that opposes a surface over which the vehicle is travelling, wherein each projection of the plurality of projections extends in a direction substantially along a driving direction of the vehicle.

10. A vehicle comprising a lower control arm as claimed in claim 1.

11. A lower control arm as claimed in claim 1, wherein each projection comprises a rib extending along the underlying surface.

12. A lower control arm of a suspension system for a vehicle, comprising:
   an underlying surface of the lower control arm that opposes to a surface over which the vehicle is travelling, wherein the underlying surface of the lower control arm is configured to directly face the surface over which the vehicle is travelling;
   an excess member provided on the underlying surface of the lower control arm; and
   a plurality of grooves provided in the excess member extending up to the underlying surface of the lower control arm so as to form a plurality of projections extending in a direction substantially toward the surface over which the vehicle is travelling;
   wherein the projections form a sacrificial region configured to protect the underlying surface of the lower control arm from an object which is larger than a gap between the adjacent projections when receiving an impact on the projections from the object.

13. A lower control arm as claimed in claim 11, wherein each rib has a substantially planar surface extending across most of a width of each rib.

14. A lower control arm of a suspension system for a vehicle, comprising:
   a plurality of projections on an underlying surface that, in use, opposes a surface over which the vehicle is travelling;
   wherein the plurality of projections comprise sacrificial elements and are configured to project substantially toward the surface over which the vehicle is travelling,
   wherein the plurality of projections is configured so that any impact erosion in driving the vehicle is concentrated on the plurality of projections to protect the underlying surface, wherein each projection comprises a rib extending along the underlying surface and a pitch of the ribs is less than 20 mm.

15. A lower control arm as claimed in claim 11, wherein each rib has a width of about 10 mm, and wherein a spacing between adjacent ribs is less than 10 mm.

16. A lower control arm as claimed in claim 11, wherein each rib has a height of about 3 mm.

17. A lower control arm as claimed in claim 11, wherein an end of each rib is chamfered.

18. A lower control arm as claimed in claim 11, wherein each rib has a trapezoidal cross section.

* * * * *